3,592,791
COLORATION PROCESS
Peter William Barker, Albert Charles Cooper, and Francis Irving, Manchester, England, assignors to Imperial Chemical Industries Limited, London, England
No Drawing. Filed Nov. 13, 1967, Ser. No. 682,502
Claims priority, application Great Britain, Nov. 23, 1966, 52,466/66
Int. Cl. C08g 51/14
U.S. Cl. 260—37    4 Claims

ABSTRACT OF THE DISCLOSURE

Mass-coloration of polyamides with copper phthalocyanines containing from 1 to 4 carboxylic acid or carboxylic acid amide groups.

---

This invention relates to a coloration process and more particularly to a process for the mass-coloration of synthetic linear polyamides, in particular polyhexamethylene adipamide.

According to the invention there is provided a process for the mass-coloration of synthetic linear polyamides which comprises using as colouring matter one or more dyestuffs of the formula:

$$Pc(COY)_n$$

wherein Pc represents a metal-free or metal containing phthalocyanine dyestuff radical which is free from sulphonic acid groups, Y represents —OH or —$NH_2$, and $n$ represents an integer of from 1 to 4.

Each of the —COY groups, which are preferably —COOH groups, is attached to a carbon atom of a benzene ring present in the phthalocyanine radical. The phthalocyanine radical can be free from metal, but preferably it contains a metal atom such as a cobalt, nickel, and above all, a copper atom. The preferred dyestuffs for use in the process are copper phthalocyanine mono-, di,- tri- or tetra-carboxylic acids, or a mixture of two or more of these acids.

The process of the invention can be conveniently carried out by incorporating one or more of the said dyestuffs into the synthetic linear polyamides by any of the known techniques for mass coloration of such materials. Thus the dyestuffs in finely divided form may be added at any stage during the formation of the synthetic linear polyamides by polymerisation of the polyamide forming components. It is however preferred that the dyestuffs is added at the initial stage of charging the polyamide forming components to the vessel in which the polymerisation is to be carried out in the manner normally used when starting from such components. At the conclusion of the polmerisation the coloured polymer is discharged from the vessel, usually in the form of a ribbon, and converted into chip form. This is then subsequently remelted and extruded into filaments. The dyestuff can either be added in the form of a finely divided dry powder or there can be added a dispersion of the dyestuff in a volatile liquid, such as water, which does not react with the polyamide forming components. Such a dispersion of the dyestuff can also contain anionic, cationic, or non-ionic dispersing agents which are commonly used in the preparation of dyestuff dispersions.

Alternatively the dyestuff in finely divided form can be coated onto chips of the preformed polyamide, and the resulting mixture, preferably after removal of the volatile liquid when a dyestuff dispersion is used, melted and spun into filaments.

If desired the dyestuffs wherein Y represents —OH can be used in the form of salts, such as the ammonium salts, which give rise to the free acids during the heat treatment required to melt the polyamide or to polymerise the polyamide-forming components.

As examples of synthetic linear polyamides which can be coloured by the process of the invention there may be mentioned polyamides which are obtained by polymerising a monoaminomonocarboxylic acid or lactam thereof having at least two carbon atoms between the amino and carboxylic acid groups, or by polymerising substantially equimolecular proportions of a diamine which contains at least two carbon atoms between the amino groups and a dicarboxylic acid which contains at least two carbon atoms between the carboxylic acid groups.

As examples of the said polymerisable monoamino-monocarboxylic acids, or lactams thereof, there may be mentioned ε-aminocaproic acid, caprolactam, 9-aminononanoic acid, 11-aminoundecanoic acid, 17-aminoheptadecanoic acid, dodecanolactam, capryllactam, enantholactam and pyrrolidone.

As examples of the said diamines there may be mentioned diamines of the general formula $H_2N(CH_2)_mNH_2$ wherein $m$ is an integer of from 2 to 12, such as trimethylenediamine, tetramethylenediamine, pentamethylenediamine, octamethylenediamine and, above all, hexamethylenediamine.

As examples of said dicarboxylic acids there may be mentioned terephthalic acid and isophthalic acid, and preferably the dicarboxylic acids of the formula $$HOOC \cdot Y \cdot COOH$$

wherein Y is a divalent aliphatic radical containing at least 2 carbon atoms, and as examples of such acids there may be mentioned sebacic acid, octadecanedioic acid, suberic acid, azelaic acid, undecanedioic acid, glutaric acid, pimelic acid and, above all, adipic acid.

The phthalocyanine dyestuffs used in the process of the invention may be obtained by known methods. Thus for example the dyestuffs wherein Y represents —OH can be obtained by passing phosgene through a molten mixture of the parent phthalocyanine compound in aluminium chloride, pouring the mixture onto ice, acidifying and filtering off the precipitated dyestuff. Alternatively the dyestuffs can beobtained by heating a mixture of benzene 1:2:3- or 1:2:4-tricarboxylic acid (or a mixture of a benzene tricarboxylic acid and phthalic anhydride), urea, and a metal compound in trichlorobenzene containing ammonium molybdate, isolating the resulting carboxylic acid amide, and, if necessary, subjecting it to an alkaline hydrolysis to obtain (after subsequent acidification) the free carboxylic acid. In general these methods tend to give mixtures of products so that $n$ represents the average value of the number of carboxylic acid, or amide groups thereof, present in the dyestuff.

The colorations produced by the process of the invention have good fastness to washing, pressure steaming, acid cross dyeing, perspiration, rubbing after steaming, dry heat treatments such as are used in pleating operations, and to light. It is also found that the colorations can be produced in heavy depths of shade, without impairing the properties, in particular the spinning properties, of the synthetic polyamides, or fibers derived therefrom.

The invention is illustrated, but not limited, by the following examples in which the parts and percentages are by weight.

EXAMPLE 1

1048 parts of hexamethylenediammonium adipate, 1.43 parts of acetic acid, 55 parts of an aqueous dispersion containing 16.4% of copper phthalocyanine dicarboxylic acid and 1.64% of the disodium salt of bis(2-sulphonaphth-1-yl)methane, and 400 parts of water are charged to a stainless steel autoclave, which is then heated to 100° C. The autoclave is purged with steam, then closed, and heating is continued until a pressure of 260 pounds per sq. in. (p.s.i.) and a temperature of 215° C. is obtained. Heating is then continued until a temperature of 235° C. is obtained whilst the pressure is maintained at 250 p.s.i. by a slow release of steam from the autoclave. The pressure in the autoclave is then slowly reduced to atmospheric pressure while the temperature is raised to 275° C. After 20 minutes at this temperature the polymer is discharged from the autoclave, cooled and converted to chip form. When the resulting chips are subsequently melted and spun into fibres, bright blue fibres are obtained possessing excellent fastness to light and to wet treatments. Examination of the fibres shows that the dyestuff is uniformly distributed throughout the polymer.

The copper phthalocyanine dicarboxylic acid used in the above example was obtained by heating a mixture of equimolecular proportions of trimellitic anhydride and phthalic anhydride, urea and cupric chloride in trichlorobenzene, in the presence of ammonium molybdate as catalyst, subjecting the resulting carboxylic acid amide to an aqueous alkaline hydrolysis and isolating the carboxylic acid by acidification.

EXAMPLE 2

In place of the aqueous dispersion of the dyestuff used in Example 1 there are used 420 parts of an aqueous dispersion containing 2.16 parts of a copper phthalocyanine tricarboxylic acid and 0.5% of the disodium salt of bis(2-sulphonaphth-1-yl)methane whereby the resulting fibres are coloured a bluish green shade of excellent fastness properties.

The copper phthalocyanine tricarboxylic acid used in this example was obtained by passing phosgene through a molten mixture of copper phthalocyanine, aluminium chloride and sodium chloride as described in British specification No. 510,901.

EXAMPLE 3

In place of the aqueous dispersion of the dyestuff used in Example 1 there are used 189 parts of an aqueous dispersion containing 1.44% of copper phthalocyanine dicarboxylic acid amide and 0.16% of the disodium salt of bis(2-sulphonaphth-1-yl)methane, whereby bright blue fibres are obtained which possess excellent fastness properties.

EXAMPLE 4

94 parts of polyhexamethylene adipamide in the form of chip were thoroughly mixed with 20 parts of an aqueous dispersion containing 5.1% of copper phthalocyanine dicarboxylic acid, 25.5% of polyhexamethylene adipamide powder and 0.4% of the disodium salt of bis(2-sulphonaphth-1-yl)methane. The mixture was dried for 16 hours at 120° under reduced pressure, and the resulting solid was melted and spun to give bright blue fibres possessing excellent fastness properties.

EXAMPLE 5

226 parts of caprolactam, 73 parts of an aqueous dispersion containing 2.9% of copper phthalocyanine dicarboxylic acid and 0.7% of the disodium salt of bis(2-sulphonaphth-1-yl)methane and 200 parts of water are charged to a stainless steel autoclave which is then heated to 100° C. The autoclave is purged with steam, then closed, and heating is continued until a pressure of 250 lbs./sq. inch and a temperature of 215° C. are obtained. Heating is then continued until 235° C. is reached whilst the pressure is maintained at 250 lbs./sq. inch by slow release of steam from the autoclave. The pressure is then slowly reduced to atmospheric pressure whilst the temperature is raised to 265° C. which is then maintained for 20 minutes. The coloured polymer is then discharged from the autoclave in the form of a ribbon which is cooled and cut into the form of chips. When the chips are subsequently remelted and spun, bright blue filaments of excellent fastness properties are obtained. Examination of the filaments shows that the dyestuff is uniformly distributed throughout the polymer.

We claim:
1. Process for mass coloring polyamides which comprises using as the sole phthalocyanine dyestuff present, a mass coloring amount of a finely divided dyestuff of the formula: $P_c(COY)_n$ wherein PC represents a metal or metal-free phthalocyanine radical having each —COY group directly attached to a carbon atom of a benzene ring present in the phthalocyanine nucleus,

Y is selected from the class consisting of —OH and —NH$_2$; and $n$ is a positive integer not exceeding 4.

2. Process as claimed in claim 1 wherein the dyestuff in finely-divided form is mixed with the polyamide, and the resulting mixture is melted and spun into filaments.

3. Process as claimed in claim 1 wherein the dyestuff is mixed with the polyamide forming components which are then converted to the polyamide by polymerisation.

4. A polyamide containing as the sole phthalocyanine dyestuff present, a mass coloring amount of a dyestuff of the formula: $P_c(COY)_n$ wherein PC represents a metal containing or metal-free phthalocyanine radical having each —COY group directly attached to a carbon atom of a benzene ring present in the phthalocyanine nucleus, Y is selected from the class consisting of —OH and —NH$_2$; and $n$ is a positive integer not exceeding 4.

References Cited

UNITED STATES PATENTS 2,805,957   9/1957   Ehrick _____ 106—288

FOREIGN PATENTS 820,975   9/1959   Great Britain.

MORRIS LIEBMAN, Primary Examiner

R. ZAITLEN, Assistant Examiner

U.S. Cl. X.R.

260—314.5